(12) United States Patent
Murphy et al.

(10) Patent No.: US 6,487,043 B1
(45) Date of Patent: Nov. 26, 2002

(54) CROSS TEXTURE HEAD DISC INTERFACE

(75) Inventors: James M. Murphy, Boulder; Joshua C. Harrison, Longmont, both of CO (US)

(73) Assignee: Seagate Technology LLC, Scotts Valley, CA (US)

( * ) Notice: Subject to any disclaimer, the term of this patent is extended or adjusted under 35 U.S.C. 154(b) by 0 days.

(21) Appl. No.: 09/178,231

(22) Filed: Oct. 23, 1998

Related U.S. Application Data

(60) Provisional application No. 60/065,165, filed on Dec. 4, 1997.

(51) Int. Cl.[7] .................................................. G11B 5/82
(52) U.S. Cl. ...................................................... 360/135
(58) Field of Search ................................. 360/135, 131, 360/103

(56) References Cited

U.S. PATENT DOCUMENTS

| | | | | |
|---|---|---|---|---|
| 3,754,104 A | * | 8/1973 | Piper et al. ............ 179/100.2 P |
| 4,327,387 A | * | 4/1982 | Plotto .......................... 360/103 |
| 4,692,832 A | * | 9/1987 | Bandara et al. ............. 360/137 |
| 4,757,402 A | * | 7/1988 | Mo ............................. 360/103 |
| 4,853,810 A | * | 8/1989 | Pohl et al. ................... 360/103 |
| 4,901,185 A | * | 2/1990 | Kubo et al. ................. 360/104 |
| 5,010,429 A | * | 4/1991 | Taguchi et al. ............. 360/103 |
| 5,012,572 A | * | 5/1991 | Matsuzawa et al. .......... 29/603 |
| 5,020,213 A | * | 6/1991 | Aronoff et al. ............... 29/603 |
| 5,034,828 A | * | 7/1991 | Ananth et al. ................ 360/75 |
| 5,052,099 A | * | 10/1991 | Taguchi et al. ............... 29/603 |
| 5,063,712 A | | 11/1991 | Hamilton et al. .............. 51/67 |

(List continued on next page.)

FOREIGN PATENT DOCUMENTS

| | | |
|---|---|---|
| EP | 0 422 660 A2 | 8/1991 |
| EP | 0 442 660 | 8/1991 |
| JP | 54-23517 | 2/1979 |
| JP | 56-107363 | 8/1981 |
| JP | 59-193580 A | 2/1984 |
| JP | 4-245054 A * | 1/1992 |
| JP | 8-69674 | 3/1996 |
| JP | 8-069674 A * | 3/1996 |
| JP | 8-212740 A * | 8/1996 |
| JP | 408279132 A | 10/1996 |
| JP | 8-287440 A | 11/1996 |

OTHER PUBLICATIONS

I. Etsion and L. Burstein, "A Model for Mechanical Seals with Regular Microsurface Structure", *Tribology Transactions*, vol. 39, (1996), pp. 667–683.*

Jing Gui et al., "A stiction model for a head–disk interface of a rigid disk drive", *J.Appl.Phys.*, vol. 78 (6), Sep. 15, 1995, pp. 4206–4217.*

G. Halperin et al., "Increasing Mechanical Seals Life With Laser–Textured Seal Faces", *Surface Surtech Technologies, Ltd.*, Sep., 1997, pp. 1–12.*

"Magnetic Disk Storage System With Structured Magnetic Head Slider", *IBM Technical Disclosure Bulletin*, vol. 27, No. 10 (A), Mar., 1985, pp. 3–4.

Y. Kasamatsu et al., "Stiction Free Slider for the Smooth Surface Disk", *IEEE Transactions on Magnetics*, vol. 31, No. 6., Nov., 1995, pp. 2961–2963.

*Primary Examiner*—Allen Cao
(74) *Attorney, Agent, or Firm*—Westman, Champlin & Kelly, P.A.

(57) ABSTRACT

A disc drive is disclosed that includes textured features on the disc surface and a slider. The slider texture can include one or more features oriented in a first direction, and the disc can include one or more features oriented in a second direction. The first and second directions are selected such that the second direction includes a component that is perpendicular to the first direction. The orientation of the features facilitates the provision of matrix of contact points between the slider and the disc surface.

18 Claims, 7 Drawing Sheets

U.S. PATENT DOCUMENTS

| | | | |
|---|---|---|---|
| 5,067,037 A | 11/1991 | Ananth et al. | 360/103 |
| 5,079,657 A | 1/1992 | Aronoff et al. | 360/103 |
| 5,162,073 A | 11/1992 | Aronoff et al. | 156/625 |
| 5,200,867 A | 4/1993 | Albrecht et al. | 360/103 |
| 5,202,803 A | 4/1993 | Albrecht et al. | 360/97.02 |
| 5,267,104 A | 11/1993 | Albrecht et al. | 360/97.02 |
| 5,285,337 A | 2/1994 | Best et al. | 360/97.02 |
| 5,323,282 A | 6/1994 | Kanai et al. | 360/103 |
| 5,345,353 A | 9/1994 | Krantz et al. | 360/103 |
| 5,386,666 A | 2/1995 | Cole | 451/5 |
| 5,388,020 A | 2/1995 | Nakamura et al. | 360/135 |
| 5,396,386 A | 3/1995 | Bolasna et al. | 360/103 |
| 5,396,387 A | 3/1995 | Murray | 360/103 |
| 5,418,667 A | 5/1995 | Best et al. | 360/103 |
| 5,420,735 A | 5/1995 | Haines | 360/103 |
| 5,424,888 A | 6/1995 | Hendriks et al. | 360/103 |
| 5,490,027 A | 2/1996 | Hamilton et al. | 360/104 |
| 5,499,149 A | 3/1996 | Dovek | 360/103 |
| 5,508,861 A | 4/1996 | Ananth et al. | 360/103 |
| 5,526,204 A | 6/1996 | French et al. | 360/97.02 |
| 5,537,273 A | 7/1996 | Hendriks et al. | 360/103 |
| 5,550,691 A | 8/1996 | Hamiton | 360/103 |
| 5,550,693 A | 8/1996 | Hendriks et al. | 360/103 |
| 5,550,696 A | 8/1996 | Nguyen | 360/135 |
| 5,557,488 A | 9/1996 | Hamilton et al. | 360/104 |
| 5,569,506 A | 10/1996 | Jahnes et al. | 428/65.3 |
| 5,572,386 A | 11/1996 | Ananth et al. | 360/103 |
| 5,625,512 A | 4/1997 | Smith | 360/103 |
| 5,626,941 A | 5/1997 | Ouano | 428/141 |
| 5,774,303 A | 6/1998 | Teng et al. | |
| 5,815,346 A | 9/1998 | Kimmal et al. | |

\* cited by examiner

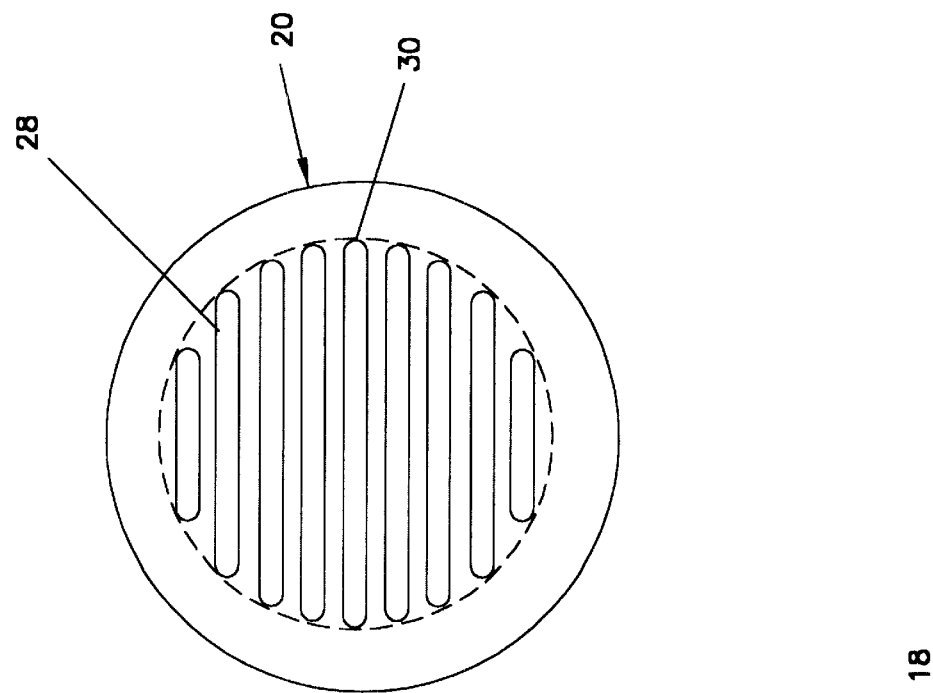
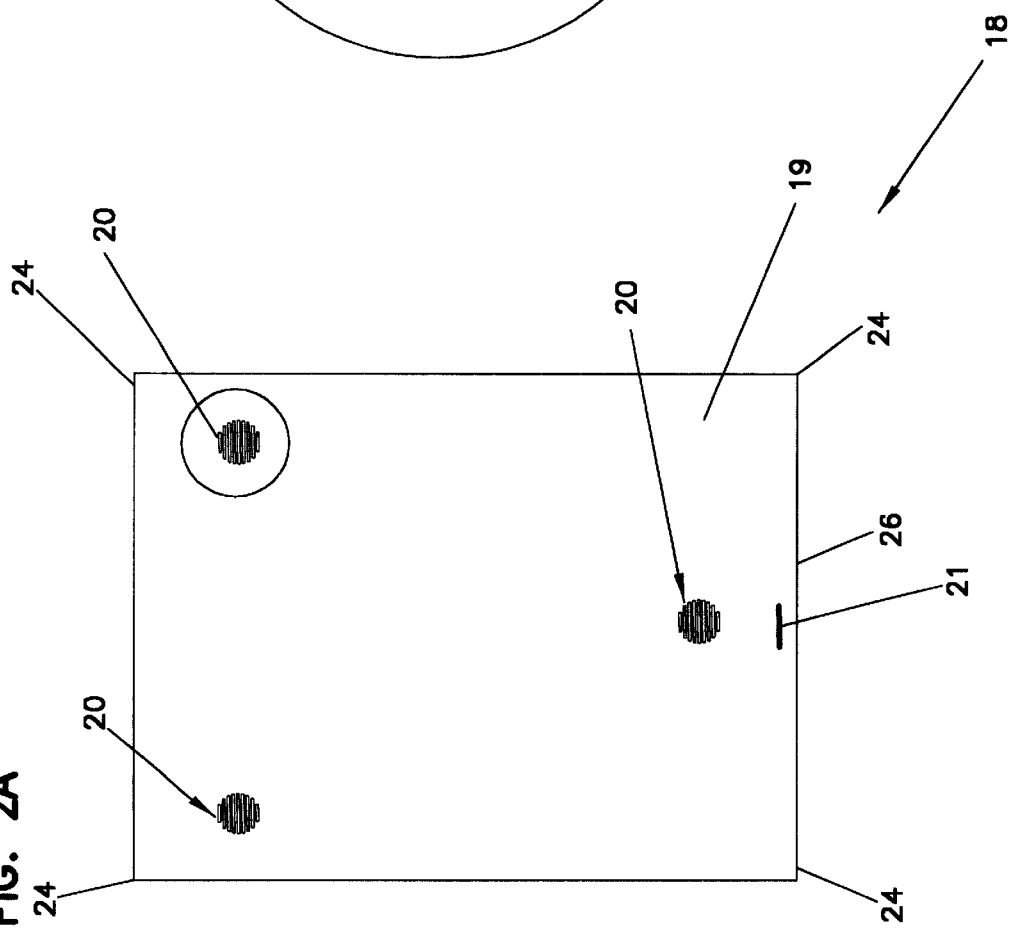

CROSS TEXTURE HEAD DISC INTERFACE

CROSS REFERENCE TO RELATED APPLICATION

This application claims the priority of an earlier filed co-pending provisional application Serial No. 60/065,165, filed Dec. 4, 1997, entitled CROSSED TEXTURE HEAD DISC INTERFACE.

BACKGROUND OF THE INVENTION

The present invention relates to disc storage devices. More specifically, the present invention relates to an apparatus for reducing head stiction between a disc and a head in a disc drive.

Disc drives are the primary devices employed for mass storage of computer programs and data used in computer systems. Within a disc drive, a load beam supports a hydrodynamic air bearing (or slider) proximate a rotating magnetic disc. The load beam supplies a downward force that counteracts the hydrodynamic lifting force developed by the air bearing. The slider carries a magnetic transducer for communicating with individual positions on the rotating magnetic disc.

As the areal density of hard disc drive products increases, there is a need for the flying height of the recording heads above the discs to be reduced, and concomitantly, for the discs' smoothness to be increased. Increasing the smoothness of the discs, however, increases static friction and possibly dynamic friction and may accelerate wear at the head-disc interface (HDI).

The main approach for mitigating this "stiction" problem has been to apply a controlled amount of texture to the disc. Both random mechanically-applied and non-random laser-applied textures have been extensively used. This approach, however, is nearing its limits: as the disparity in surface roughness between the landing zone and data zone increases, it becomes increasingly difficult to design an air bearing which has acceptable flying characteristics in both regions. For example, a head which flies suitably low in the data zone will not fly in the rougher landing zone, and heavy contact (producing high friction and wear) may ensue.

Thus, there exists a need to provide a head/disc interface which further reduces stiction from the prior art in order to facilitate the high areal densities required by the advancing state of the art.

SUMMARY OF THE INVENTION

A disc drive includes a rotating disc with a disc surface and read/write circuitry for reading data from and writing data to the rotating disc. Further, the disc drive includes a controller for providing control signals. An actuator assembly is provided which is coupled to the controller and receives signals from the controller and provides actuation based upon the control signals. A head is coupled to the actuator assembly and operably coupled to the read/write circuitry. The head includes an air bearing surface having a protruding feature which is oriented in a non-parallel direction to a feature on the disc surface.

BRIEF DESCRIPTION OF THE DRAWINGS

FIG. 2A is a bottom plan view of a slider in accordance with an embodiment of the present invention.

FIG. 2B is an enlarged view of a textured region on a slider in accordance with an embodiment the present invention.

DETAILED DESCRIPTION OF THE PREFERRED EMBODIMENTS

Figure 1:
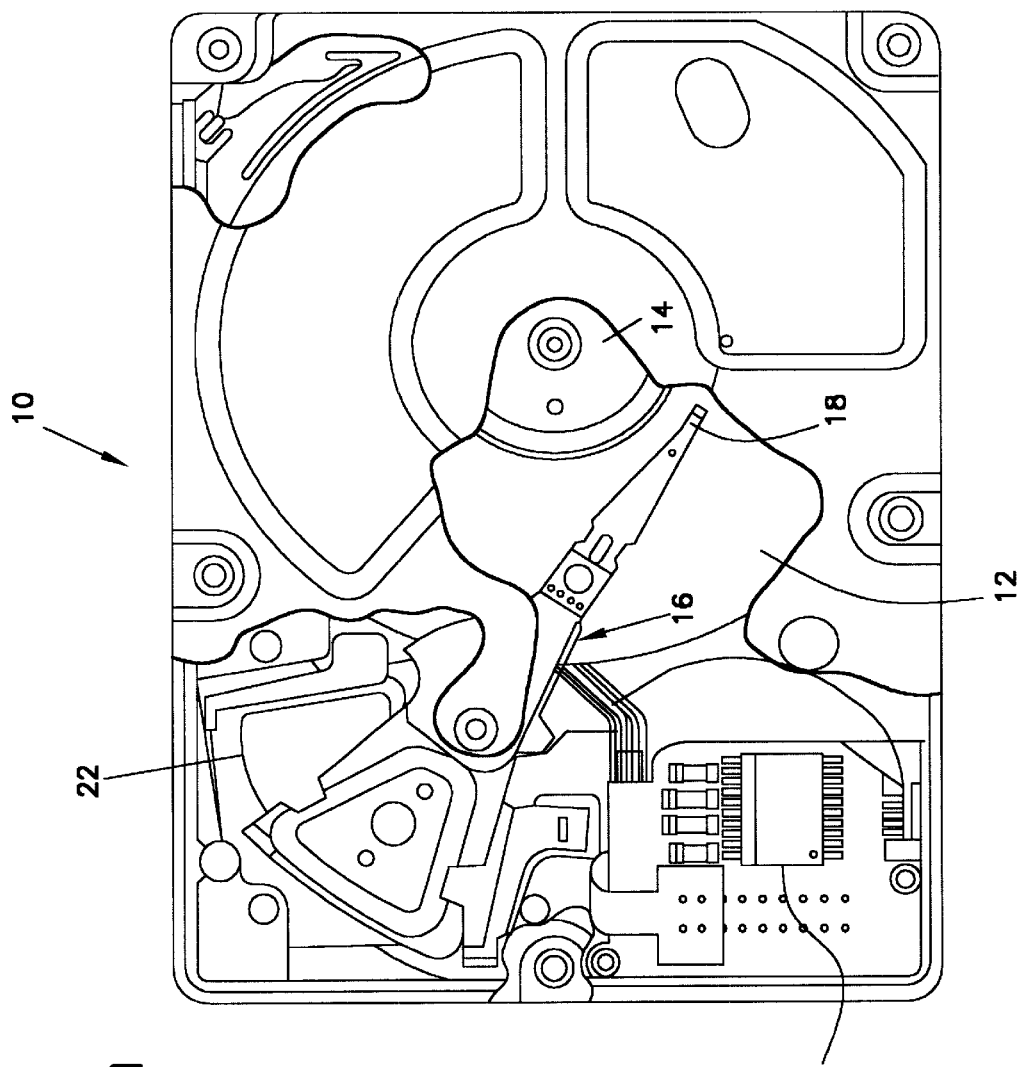
FIG. 1 is a diagrammatic view of the storage drive 10 in accordance with the present invention.

FIG. 1 is a diagrammatic view of storage drive 10 in accordance with the present invention. Storage drive 10 is coupled to a computer (not shown) such that the computer transfers data to and reads data from storage drive 10. Storage drive 10 includes disc 12, spindle 14, load arm 16, slider 18, control circuitry 20 and actuator 22.

Disc 12 is fixed about spindle 14. Spindle 14 is coupled to a spindle motor (not shown) such that energization of the spindle motor causes spindle 14 and disc 12 to rotate. When disc 12 rotates, slider 18 flies above disc 12 and is magnetically or optically coupled to the surface of disc 12. Actuator 22 is coupled to disc controller 20 and is adapted to move slider 18 across the surface of disc 12 in response to an actuation signal from disc controller 20. In addition to controlling actuator 22, disc controller 20 is electrically coupled to slider 18 to read and write data to the disc surface. Disc 12 has two active surfaces with a slider 18 operating proximate each active surface. Thus, multiple load arms 16 and sliders 18 generally reside in a given storage drive 10.

FIG. 2A is a bottom plan view of slider 18 in accordance with one embodiment of the present invention. Slider 18 includes air bearing surface 19 which includes three or more textured portions 20 which are disposed on air bearing surface 19 and a transducing head 21. Textured portions 20 are attached to and extend from air bearing surface 19. In one embodiment, three textured portions 20 are utilized, such that two such textured portions are near corners 24 of air bearing surface 19, and one such textured portion is near the center of edge 26. By locating textured regions 20 in this manner, air bearing surface 19 is able to make stable three-point contact with the disc which ensures that each of the three textured portions (also referred to herein as contact regions or patches) makes full contact with disc 12. Designs with less than three supports (i.e. textured regions) may allow non-textured areas of the head to touch the disc, thereby diminishing the stiction reduction benefits of the present invention.

FIG. 2B is an enlarged view of one of textured regions 20. As can be see in FIG. 2B, textured region 20 preferably includes a plurality of slider ridges 28 which are aligned generally parallel with one another. It should be noted that although the present invention is described with respect to multiple ridges, the invention may be practiced with a single ridge/pad design. Preferably, slider ridges 28 have lengths which vary such that slider ridges 28 are circumscribed by imaginary circle 30, shown in phantom in FIG. 2B. By circumscribing slider ridges 28 with imaginary circle 30, individual ridge wear is reduced, as compared to other potential patterns having corners which would focus the wear. As a result of the circular design, wear is distributed relatively evenly over the ends of slider ridges 28.

The present invention uses the controlled application of highly anisotropic surface texture features to both the head and the disc with the directionality of the two surface texture patterns being separated by a non-zero angle such that only predictable localized contact is made between the two surfaces at the intersection of the high points of each surface. This controls the static friction, dynamic friction, and wear of the interface while permitting the air bearing to perform acceptably in all regions of the disc.

The above described surface features are best illustrated with reference to FIGS. 3A–3C. For clarity, the surface features are shown with a angular separation of 90°. However any non-zero angle (i.e. the features extend in a direction having a perpendicular component) may be used to practice the present invention. FIG. 3A shows a series of substantially parallel disc surface ridges 32 which are oriented parallel to arrow 34. FIG. 3B shows a series of substantially parallel slider ridges 28 which are aligned parallel to arrow 36. Thus, it can be seen that contact between slider ridges 28 and disc ridges 32 will result in a contact matrix as shown in FIG. 3C.

Figure 3C:
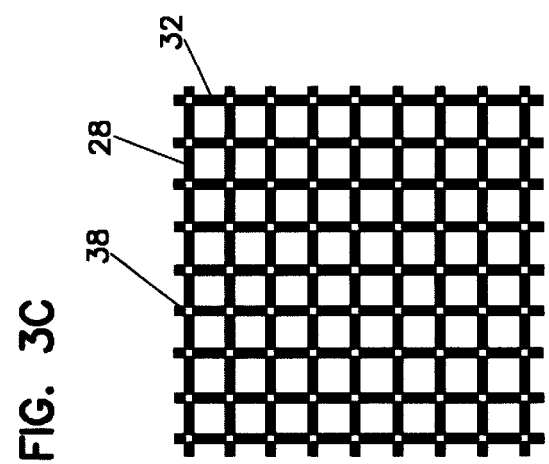
FIG. 3C is a diagrammatic view of the combination of disc and head textures in accordance with an embodiment of the present invention.
Figure 3B:
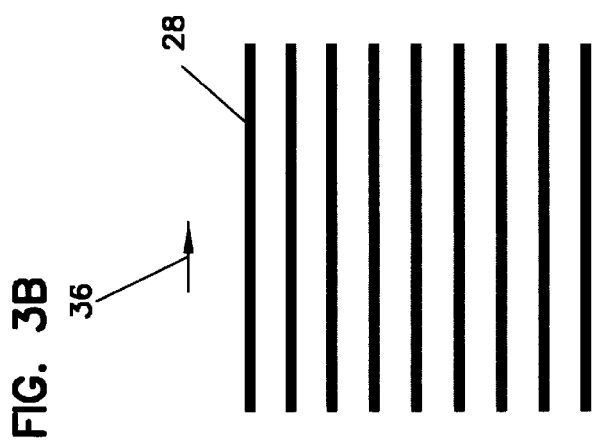
FIG. 3B is a diagrammatic view of a head texturing regime in accordance with an embodiment of the present invention.
Figure 3A:
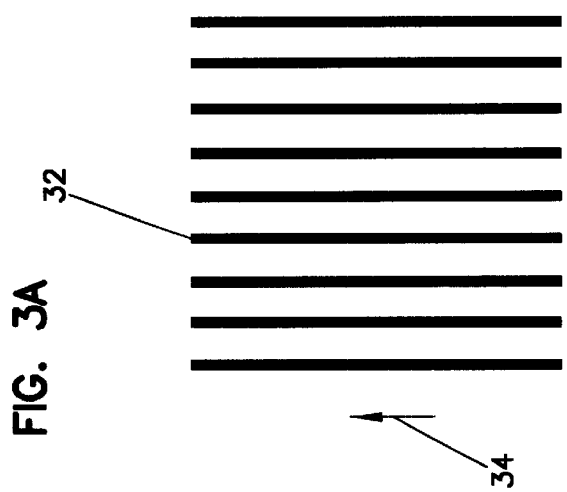
FIG. 3A is a diagrammatic view of a disc texturing regime in accordance with an embodiment of the present invention.

FIG. 3C shows slider ridges 28 contacting disc ridges 32 resulting in a matrix of contact points 38. Applying the intersecting anisotropic surface to each surface allows the instantaneous area of contact between the surfaces to be greatly diminished, while preserving the interface area over which the wear is distributed. The ridges may be comprised of diamond-like carbon (DLC) which is deposited on the head using photolithographic techniques and deposited on the disc with a form of circumferential "spiral laser texture".

One preferred embodiment of a slider in accordance with the present invention is that shown in FIG. 2A. Specifically, the preferred slider includes three textured regions 20. However, many other texture patterns are possible. For example, four or more texture regions may be used; ridges may be disposed across the entire leading edge; ridges may cover most of air bearing surface (ABS) 19 or over rails on ABS 19; and/or discontinuous ridges could be used. Thus, it can be appreciated that the use of three separate contact regions comprised of continuous ridges is merely one example of many embodiments of the present invention.

As described above, the slider ridges may be at least partially comprised of diamond-like carbon. One method for creating diamond-like carbon ridges is as follows. First, a photoresist is applied to all regions of the air bearing surface which are not to be coated with diamond-like carbon. Then, diamond-like carbon is sputtered over the entire surface of the head. Next, the diamond-like carbon which was deposited on top of the photoresist is removed (typically using sodium bicarbonate blasting). Thus only the diamond-like carbon that was deposited directly onto the slider in the negative of the photoresist pattern will remain, as it is more strongly adhered to the surface. Finally, the head is cleaned with de-ionized water. Those skilled in the art will recognize that the textured features of the present invention may be fabricated through a variety of appropriate methods.

Figure 4:
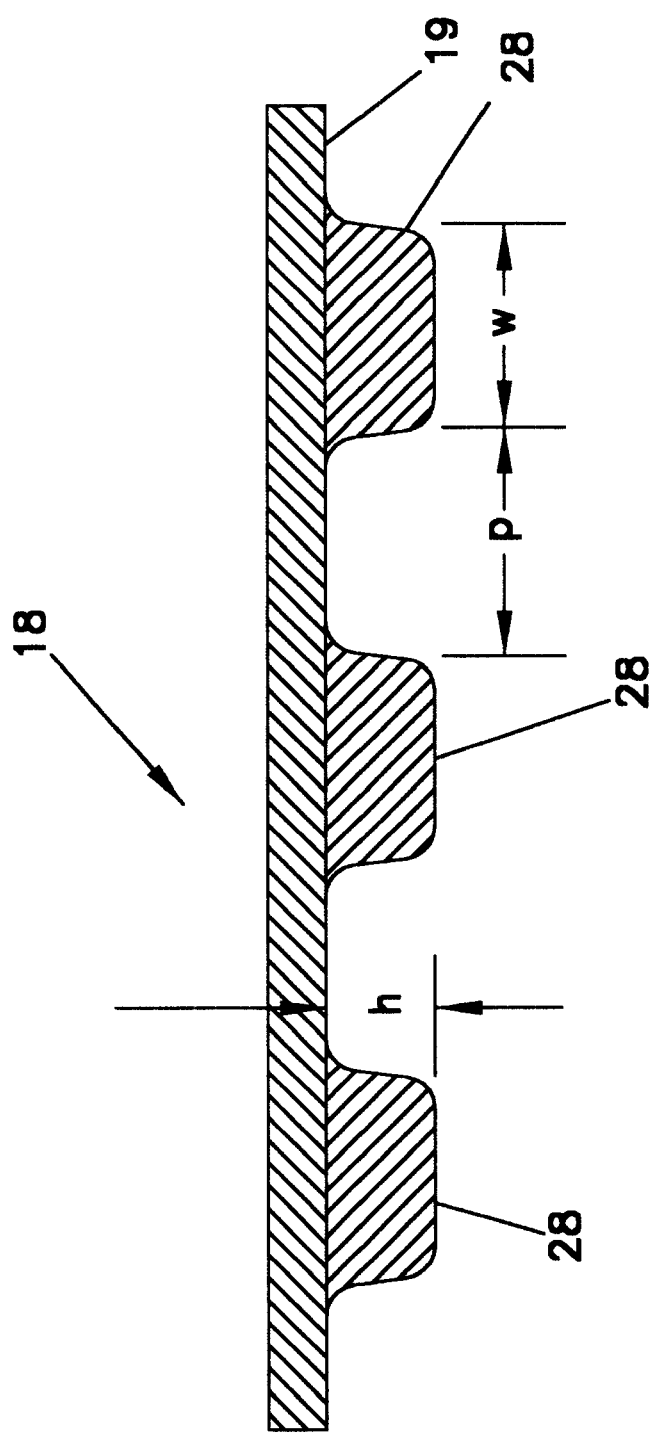
FIG. 4 is a cross-sectional view of a portion of a textured head in accordance with an embodiment of the present invention.

FIG. 4 shows a typical cross-section of applied slider ridge 28 on air bearing surface 19. As can be seen in FIG. 4, slider ridges 28 have a substantially rectangular cross-section. Control of the cross-section of slider ridges 28, in conjunction with the cross-section of ridges 32 disposed on the disc, allows the rate of increase of bearing area with wear to be controlled. In fact, if the edges of the ridges are nearly normal to the head surface (i.e., of rectangular cross-section), the change in the bearing area with wear can approach zero. FIG. 4 shows slider ridges 28 extending from air bearing surface 19 a distance of approximately h. It is recommended that h (ridge height) be on the order of about 350 Å as a starting point for this design. This height should prevent head-disc contact at locations other the textured contact zones due to head and disc curvature, allowing for a reduction in height of the ridges over the life of the drive due to wear. With the three textured regions shown in FIG. 2A, this unintended contact is most likely to occur near the center of the slider, often called "belly contact". Because it results from head and disc curvature, this contact can be mitigated with the use of a head with low crown and/or cross-crown. (Note that because the disc surface is textured, such contact may not be as great a concern as on smooth discs, so lower ridges may be possible.)

It is also preferred that the ridges near the trailing edge of the slider be low enough so they do not contact the disc when the head is flying. This height constraint depends on the fly height and pitch angle of the head, and the distance of the ridges from the trailing edge. In some cases, this requirement can dictate that lower ridges be used, or that they be moved further forward on the head (where due to the positive pitch angle, the ridges would have a greater separation from the disc under steady-state flying conditions.) The width of each slider ridge 28 (shown as dimension w in FIG. 4) should be as narrow as possible to minimize the contact area while still preserving the feature accuracy and mechanical robustness. In fact, in some circumstances it may be desirable for textured regions 20 to each comprise a single ridge. On the basis of comparison with other diamond-like features deposited by the method described above, a width of 4 microns is preferred. To provide a starting point for the design, a ridge pitch of 10 microns may be used (shown as dimension p in FIG. 4). Thus, in the embodiment described, each texture region would be comprised of nine ridges of varying length.

The disc texturing of the present invention can be effected with a variety of methods. For example, laser zone texturing, or spiral laser texturing may be used to produce the desired ridges.

Laser zone texturing is a technique commonly used in the hard-drive industry to apply controlled surface texture to the landing zone of smooth recording discs. A laser beam is focused upon the surface of a disc as it spins, heating it up and producing small bumps or ridges, depending on whether the laser is pulsed or continuous. A spiral pattern is produced by monotonically varying the radius at which the laser is aimed.

Figure 5:
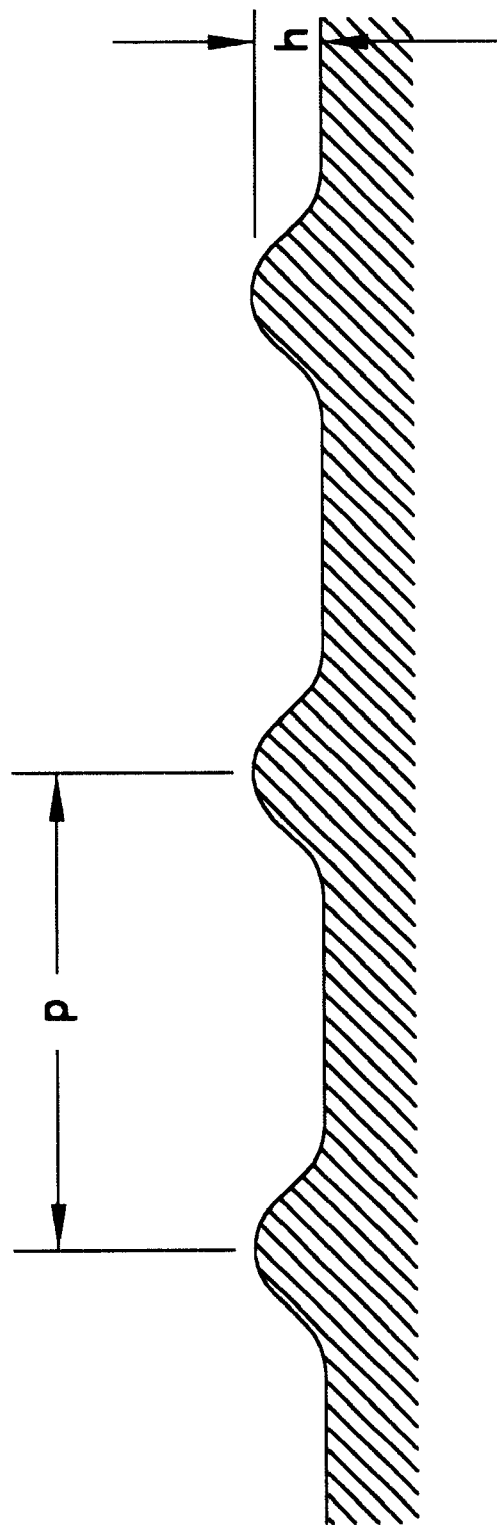
FIG. 5 is a cross-sectional view of a textured disc in accordance with an embodiment of the present invention.

Spiral laser texturing, as defined herein, is produced by using a continuous laser to create a continuous spiral ridge, or by using a laser that is pulsed fast enough so that the resultant bumps are close enough together to act as a single ridge. FIG. 5 is a schematic diagram of the cross-section of disc 12 with spiral laser texturing. The height of a given ridge (h) is dependent on the heating of the substrate at that location, and is thus controlled through the laser power and the disc rotation speed. The width of each ridge also depends on the heat applied, and so varies with the ridge height. A base width of 8 microns for a 200 Å high ridge is typical.

A ridge height on the order of 75 Å may be used as a starting point for this design. Being low relative to the current state of the art, these ridges may also be narrower than other designs, at roughly 4 microns. The contact region on top of the ridges, after burnishing, is assumed to be roughly 1 micron wide.

The radial spacing ("pitch", p) of the ridges on the disc is controlled by the rate of movement of the laser and the disc rotation speed. This pitch should be selected so that there is always a disc ridge underneath each head ridge. In this case a pitch of 12 microns was chosen.

With the present invention, continuous ridges are not necessary. In fact, continuous spiral texture (made with the laser on continuously) may be undesirable for manufacturing reasons. In this case, closely spaced or overlapping discrete protrusions or "bumps" can be used as long as either of the following conditions is met.

A. The bumps are so closely spaced together that there is always on or more bumps under each head ridge.

Figure 6:
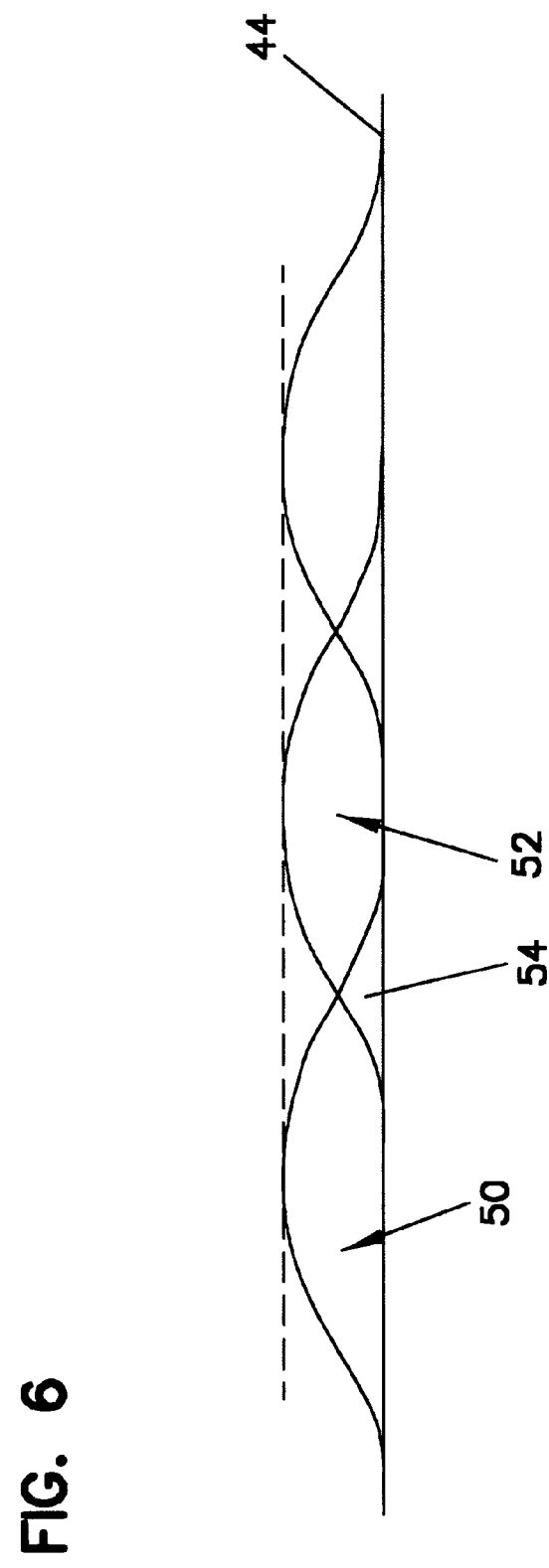
FIG. 6 is an elevation view of the portion of a disc in accordance with an alternative embodiment of the present invention.

B. Preferably, the top surfaces of the bumps form a connected region of constant height. This is achievable by overlapping the bumps slightly such that the shoulders of neighboring bumps superimpose to be the same height as the center of the bumps (this is illustrated in FIG. 6). As can be seen in FIG. 6, bumps 50 and 52 are spaced apart from one another on disc surface 44 such that they overlap in region 54

Figure 7:
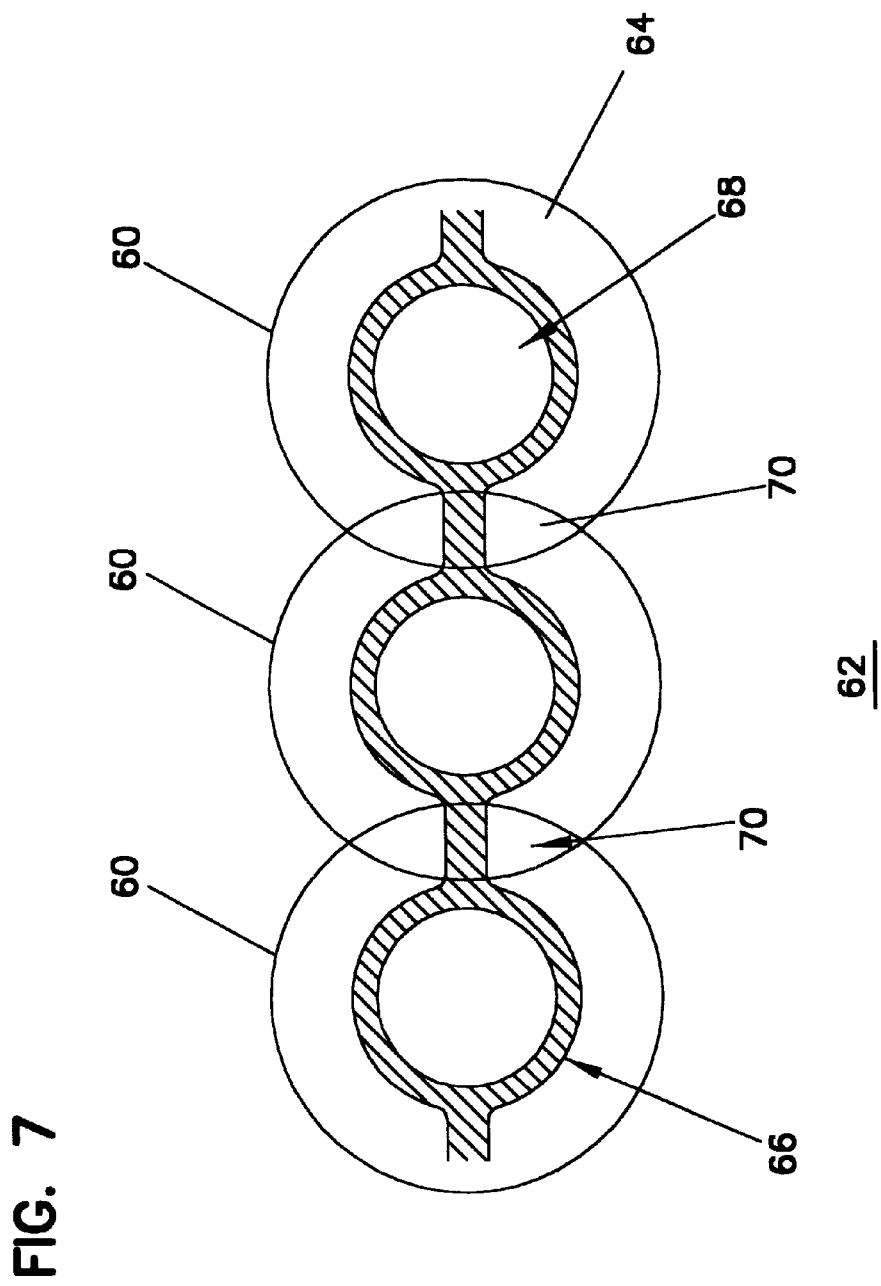
FIG. 7 is a top plan view of a portion of a textured disc in accordance with the alternate embodiment of the present invention.

Alternatively, crater-shaped bumps may be used, as shown in FIG. 7. FIG. 7 shows three craters 60 disposed on disc surface 62 and spaced apart from one another to such an extent that they overlap. As can be seen, each crater 60 has an edge 64, a flat rim 66 and a crater 68. As can further be seen, by overlapping crater-shaped bumps 60 overlapping edges 70 are formed therebetween.

Using the preliminary feature sizes suggested above, the combined interface has a contact area of 185 $\mu m^2$ per patch (after burnishing), while still distributing the wear on the head over an area of 2220 $\mu m^2$ per patch—comparable to other textured head designs (where the burnished contact area equals the wear area). Given that the friction between ultra-smooth surfaces (i.e. after burnishing) is strongly dependent on the real area of contact, and that the wear life is dependent on the wear area, this interface can be expected to have both low static and dynamic coefficients of friction and an acceptable wear life at the same time. By comparison, the wear area on the disc is approximately 1.2 million $\mu m^2$, i.e., five hundred times greater than that of the head.

In this preferred embodiment, three to seven spiral texture lines are under each head ridge at any given time. The actual number depends on the length of the slider ridge, which depends on its location within the circular texture region (longer near the center). Similarly between three and nine slider ridges would be in contact with each disc ridge at any given time. Note that the location of these contacts would be continually changing while the disc is spinning due to the spiral nature of the disc ridges (from the perspective of a slider ridge, disc ridges would appear to move along it, appearing at one end, and disappearing at the other). This allows the instantaneous contact area to be small thus producing low stiction and friction while distributing the wear over a large area.

The present invention provides many advantages over the prior art. For example, the low contact area reduces static and dynamic friction, while spreading wear over a larger area such that the wear rate is reduced. Further, the present invention provides a lower profile texture on the disc than conventional laser texture landing zones. By providing a lower profile texture on the disc, the effective fly height of the head can be reduced. This will result in earlier take off of the head from the disc during start up, later landing of the head onto the disc during shut down, and lighter contact between the slider and the disc when the air bearing is only partially formed (i.e., before take off and after landing). Further, the lower profile texture will make it easier for a given air bearing design to fly acceptably in both the smooth data zone and the textured landing zone and to transition between these zones.

The present invention may also permit shorter slider texture features than slider texture designs which do not utilize disc texture. This allows the rear most texture to be closer to the trailing edge of the slider without contacting the disc during flying, making the slider more stable against pitch moments when resting on the disc. Further still, the valleys between the ridges on both the slider and the disc will provide a space for wear debris to hide, thus clearing itself from the interface. The generation of wear debris, and its subsequent interference with the air bearing and interface is one of the main causes of increasing friction with wear and interface failures. Additionally, because both the contact locations and the shape of the contact features are controlled on both surfaces, the real area of contact (bearing area) of the interface should increase in a more predictable manner. Thus, because the sides of the head ridges are very steep, the rate of increase in bearing area with wear will be nearly zero during the design life of the interface. This is not true for interfaces which rely on random texture/roughness to mitigate stiction. Finally, the interface's stiction may be less sensitive to "belly contact" than other textured head designs, as the spiral laser texture on the disc would reduce the added stiction that results from such unintended contact.

The invention includes a disc drive having a disc with a disc texture thereon which includes a disc feature extending in a first direction. A slider includes a slider feature extending in a second direction which has a component which is perpendicular to the first direction.

Although the present invention has been described with reference to preferred embodiments, workers skilled in the art will recognize that changes may be made in form and detail without departing from the spirit and scope of the invention. For example, while the present invention has been described with respect to a rotary-actuated head, the present invention may be practiced equally with linear actuated heads. Further, the present invention is applicable to magnetoresistive, magneto-optical and optical disc drive assemblies. Further, any type of texturing may be used having any number or shape of features extending in directions which include a perpendicular component. Further still, the disc feature direction may vary with the radial or circumferential position of the disc feature on the disc.

What is claimed is:

1. A disc drive comprising:

a disc for storing data, the disc having first stiction reduction means;

a slider for reading and writing data on the disc, the slider having second stiction reducing means for cooperating with the first stiction reduction means to reduce stiction between the disc and the slider, the second stiction reducing means including a plurality of slider texture regions.

2. A disc drive comprising:

a rotating disc having a disc surface with a disc texture applied thereon including a disc feature extending in a first direction wherein the disc texture extends from the disc surface;

read/write circuitry for reading data from and writing data to the rotating disc;

a controller for providing control signals;

an actuator assembly coupled to the controller, receiving the control signals and providing actuation based upon the control signals; and a slider coupled to the actuator assembly and having a head operably coupled to the read/write circuitry, the slider having an air bearing surface with:

a first slider texture region applied thereon including a first slider feature extending in a second direction, the second direction having a component substantially perpendicular to the first direction, wherein the first slider texture region extends from the air bearing surface; and a second texture region including a second slider feature extending in a third direction, the third direction having a component aligned substantially perpendicular to the first direction, wherein the second texture region is spaced from the first texture region.

3. The disc drive of claim 2 wherein the first and second slider texture regions each comprises a plurality of ridges and each ridge in the first and second plurality of ridges includes a pair of sidewalls which are disposed substantially perpendicular to the air bearing surface.

4. The disc drive of claim 2 and further comprising:

a third texture region having a feature extending in a fourth direction, the fourth direction having a component aligned substantially perpendicular to the first direction, the third texture region being applied on the air bearing surface and spaced from the first texture region and the second texture region.

5. The disc drive of claim 4 wherein features of the first, second and third texture regions are substantially aligned with one another.

6. The disc drive of claim 2 wherein the first direction and the second direction are substantially perpendicular.

7. The disc drive of claim 2 wherein at least one of the slider features is comprised at least partially of diamond-like carbon.

8. The disc drive of claim 2 wherein the disc feature is comprised at least partially of diamond-like carbon.

9. The disc drive of claim 2 wherein the disc feature comprises ridges.

10. The disc drive of claim 9 wherein the disc ridges are substantially continuous and each of the disc ridges includes a pair of sidewalls which extend substantially perpendicular to the disc surface.

11. The disc drive of claim 9 wherein the disc ridges are connected to one another to form a substantially continuous spiral.

12. The disc drive of claim 2 wherein the disc feature comprises a plurality of disc bumps.

13. The disc drive of claim 2 wherein the first and second slider feature each have a width of approximately 4 microns.

14. The disc drive of claim 2 wherein the disc feature extends from the disc surface a distance of about 75 Å.

15. The disc drive of claim 2 wherein the first direction varies with a radial position of the disc feature on the disc.

16. The disc drive of claim 2 wherein the first direction varies with a circumferential position of the disc feature on the disc.

17. The disc drive of claim 2 wherein the ridges in the first and second plurality have lengths which vary such that the ridges ends form a circular pattern.

18. A disc drive comprising:

a rotating disc having a disc surface with a disc texture applied thereon including a disc feature extending in a first direction;

read/write circuitry for reading data from and writing data to the rotating disc;

a controller for providing control signals;

an actuator assembly coupled to the controller, receiving the control signals and providing actuation based upon the control signals; and a slider coupled to the actuator assembly and having a head operably coupled to the read/write circuitry, the slider having an air bearing surface with a plurality of localized slider texture regions applied thereon each region including a slider feature extending in a second direction, the second direction having a component perpendicular to the first direction.

* * * * *